(12) United States Patent
Wang et al.

(10) Patent No.: US 11,932,062 B2
(45) Date of Patent: Mar. 19, 2024

(54) OBJECT SURFACE MANAGING METHOD AND OBJECT SURFACE MANAGING SYSTEM

(71) Applicant: PixArt Imaging Inc., Hsin-Chu (TW)

(72) Inventors: Guo-Zhen Wang, Hsin-Chu (TW); Chang-Sheng Chiu, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/888,434

(22) Filed: Aug. 15, 2022

(65) Prior Publication Data

US 2022/0388355 A1 Dec. 8, 2022

Related U.S. Application Data

(63) Continuation of application No. 15/885,843, filed on Feb. 1, 2018, now Pat. No. 11,453,259.

(51) Int. Cl.
*B60C 25/00* (2006.01)
*B60C 11/24* (2006.01)
(Continued)

(52) U.S. Cl.
CPC .......... *B60C 25/007* (2013.01); *B60C 11/246* (2013.01); *B60Q 9/00* (2013.01);
(Continued)

(58) Field of Classification Search
None
See application file for complete search history.

(56) References Cited

U.S. PATENT DOCUMENTS 5,054,918 A 10/1991 Downing
5,245,867 A 9/1993 Sube
(Continued)

FOREIGN PATENT DOCUMENTS

CN 1158159 A 8/1997
CN 1227629 A 9/1999
(Continued)

OTHER PUBLICATIONS

Qiu, Yongliang, Study on digital design method of the tire pattern based on reverse engineering, A Thesis Submitted to Guangdong University of Technology for the Degree of Master of Engineering, May 2007.
(Continued)

*Primary Examiner* — Peter D Nolan
*Assistant Examiner* — Michael F Whalen
(74) *Attorney, Agent, or Firm* — Winston Hsu

(57) ABSTRACT

A tire surface managing method, comprising: emitting detecting light to a target object on a surface of a tire; receiving reflected detecting light from the target object and from the surface adjacent to the target object; determining whether the target object protrudes according to a distance calculated according to the reflected detecting light from the target object and a distance calculated according to the reflected detecting light from the surface; determining whether the target object forms a hole on the surface according to the distance calculated according to the reflected detecting light from the target object and the distance calculated according to the reflected detecting light from the surface; receiving the reflected detecting light from the surface to calculate a width of the hole on the tire; and activating a protection mechanism for a vehicle comprising the tire if the width is larger than a width threshold.

8 Claims, 8 Drawing Sheets

(51) Int. Cl.
  *B60Q 9/00* (2006.01)
  *G01B 11/04* (2006.01)
  *G01B 11/22* (2006.01)
  *G01B 11/25* (2006.01)
  *G01M 17/02* (2006.01)
  *G01S 17/04* (2020.01)
  *B60K 28/10* (2006.01)

(52) U.S. Cl.
  CPC ............ *G01B 11/046* (2013.01); *G01B 11/22* (2013.01); *G01B 11/2522* (2013.01); *G01M 17/02* (2013.01); *G01S 17/04* (2020.01); *B60K 28/10* (2013.01)

(56) References Cited

U.S. PATENT DOCUMENTS

| | | |
|---|---|---|
| 5,895,845 A | 4/1999 | Burger |
| 5,987,978 A | 11/1999 | Whitehead |
| 6,069,966 A | 5/2000 | Jones |
| 7,043,396 B2 | 5/2006 | Larson |
| 2005/0057758 A1 | 3/2005 | Uehara |
| 2006/0124214 A1 | 6/2006 | Bauchot |
| 2008/0174789 A1 | 7/2008 | Uffenkamp |
| 2009/0033949 A1 | 2/2009 | Braghiroli |
| 2011/0126617 A1 | 6/2011 | Bengoechea Apezteguia |
| 2012/0067115 A1 | 3/2012 | Pingel |
| 2013/0090879 A1 | 4/2013 | Estor |
| 2014/0043472 A1 | 2/2014 | Takahashi |
| 2014/0086453 A1 | 3/2014 | Imada |
| 2015/0330773 A1 | 11/2015 | Uffenkamp |
| 2016/0052349 A1 | 2/2016 | Elsawah |
| 2016/0069779 A1 | 3/2016 | Uffenkamp |
| 2016/0109332 A1 | 4/2016 | Araki |
| 2016/0245725 A1 | 8/2016 | Braghiroli |
| 2016/0299036 A1 | 10/2016 | Araki |
| 2017/0124784 A1 | 5/2017 | Wittmann |
| 2017/0368892 A1 | 12/2017 | Heuermann |
| 2018/0172605 A1 | 6/2018 | Brunner |
| 2018/0257653 A1 | 9/2018 | Seaman |
| 2019/0047330 A1 | 2/2019 | Salter |
| 2019/0120722 A1 | 4/2019 | Wakasugi |
| 2019/0236860 A1 | 8/2019 | Madrid |

FOREIGN PATENT DOCUMENTS

| | | |
|---|---|---|
| CN | 1624420 A | 6/2005 |
| CN | 1997870 A | 7/2007 |
| CN | 101358839 A | 2/2009 |
| CN | 101363724 A | 2/2009 |
| CN | 102084213 A | 6/2011 |
| CN | 102388290 A | 3/2012 |
| CN | 102427957 A | 4/2012 |
| CN | 203732021 U | 7/2014 |
| CN | 103987539 A | 8/2014 |
| CN | 104011501 A | 8/2014 |
| CN | 104691255 A | 6/2015 |
| CN | 104870934 A | 8/2015 |
| CN | 104937389 A | 9/2015 |
| CN | 105452803 A | 3/2016 |
| CN | 106030275 A | 10/2016 |
| CN | 106403837 A | 2/2017 |
| CN | 107430185 A | 12/2017 |
| EP | 0 469 948 A1 | 2/1992 |
| EP | 0 869 330 A2 | 10/1998 |
| JP | 2007-78649 A | 3/2007 |
| JP | 2012-154910 A | 8/2012 |
| JP | 2017-187418 A | 10/2017 |

OTHER PUBLICATIONS

M.M. Topaç et al., Fatigue life prediction of a heavy vehicle steel wheel under radial loads by using finite element analysis, Engineering Failure Analysis 20 (2012), Elsevier, pp. 67-79. ,2012.

Sydney University Physics Education Research (SUPER) Group, "What is Light?", Life Sciences Notes, pp. 1-14, last modified on Mar. 16, 2006, retrieved on Nov. 3, 2020 from the Internet URL: http://www.physics.usyd.edu.au/super/life_sciences/L/L-all.pdf.

OBJECT SURFACE MANAGING METHOD AND OBJECT SURFACE MANAGING SYSTEM

CROSS REFERENCE TO RELATED APPLICATIONS

This application is a continuation application of U.S. application Ser. No. 15/885,843, filed on Feb. 1, 2018. The content of the application is incorporated herein by reference.

BACKGROUND OF THE INVENTION

1. Field of the Invention

The present invention relates to an object surface managing method and an object surface managing system, and particularly relates to an object surface managing method and an object surface managing system which can optically measure tire groove depths or holes on the tire.

2. Description of the Prior Art

Tire groove depths are very important for a vehicle. If the tire groove depths are too shallow, the vehicle may slip while moving, and accordingly causes a traffic accident. Therefore, the tire groove depths must be periodically and carefully measured. Conventionally, the groove depths are manually and physically measured. However, such measuring method is non-convenient, non-accurate and could not be automatically performed.

Also, some sharp objects like nails may pierce into a tire and causes damages to the tire. Such situation is also dangerous for a driver since the tire may be flat while driving. However, such sharp object on the tire is hard to be found and could not be automatically detected.

SUMMARY OF THE INVENTION

One objective of the present invention is to provide an object surface managing method and an object surface managing system, which can detect the tire grooves more accurately and automatically.

Another objective of the present invention is to provide an object surface managing method and an object surface managing system, which can detect a hole on the tire more accurately and automatically.

One embodiment of the present invention discloses a tire surface managing method, comprising: emitting detecting light to a target object on a surface of a tire; receiving reflected detecting light from the target object and reflected detecting light from the surface adjacent to the target object; determining whether the target object protrudes from the surface according to a distance calculated according to the reflected detecting light from the target object and a distance calculated according to the reflected detecting light from the surface adjacent to the target object; determining whether the target object forms a hole on the surface according to the distance calculated according to the reflected detecting light from the target object and the distance calculated according to the reflected detecting light from the surface adjacent to the target object; receiving the reflected detecting light from the surface to calculate a width of the hole on the tire; and activating a protection mechanism for a vehicle comprising the tire if the width is larger than a width threshold.

Another embodiment of the present invention discloses a tire surface managing system, comprising: a light source, configured to emit detecting light to a target object on a surface of a tire; a light sensor, configured to receive reflected detecting light from the target object and reflected detecting light from the surface adjacent to the target tire; a calculating unit, configured to determine whether the target object forms a hole on the surface according to the distance calculated according to the reflected detecting light from the target object and the distance calculated according to the reflected detecting light from the surface adjacent to the target object; and a control unit; wherein the calculating unit further calculates a width of the hole according to the reflected detecting light from the surface, and the control unit activates a protection mechanism for a vehicle comprising the tire if the width is larger than a width threshold.

Another embodiment of the present invention discloses a tire surface managing system, applied to a vehicle comprising a tire, comprising: a light source, configured to emit light to a groove on a surface of the tire; a light sensor, configured to receive first reflected detecting light from the surface and second reflected detecting light from a bottom of the groove via a light sensor; a calculating unit, configured to calculate a groove depth of the groove according to the first reflected detecting light and the second reflected detecting light; and a control unit, configured to perform following steps: calculating a relation between a moving distance of the vehicle and the groove depth; estimating a moving distance threshold according to the relation and the groove depth; and generating a reminding message if a difference between a current moving distance of the vehicle and the moving distance threshold is lower than a predetermined value.

In view of above-mentioned embodiments, the tire grooves can be measured more accurately and automatically. Also, a dangerous object or a hole on the tire can be detected as well. Thus the disadvantages of conventional methods can be improved.

These and other objectives of the present invention will no doubt become obvious to those of ordinary skill in the art after reading the following detailed description of the preferred embodiment that is illustrated in the various figures and drawings.

DETAILED DESCRIPTION

Following embodiment(s) of the present invention can be realized by a computer of a system or apparatus that reads out and executes computer executable instructions (e.g., one or more programs) recorded on a storage medium (which may also be referred to more fully as a non-transitory computer-readable storage medium') to perform the functions of one or more of the following embodiment (s) and/or that includes one or more circuits (e.g., application specific integrated circuit (ASIC)) for performing the functions of one or more of the following embodiment (s). The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Figure 1:
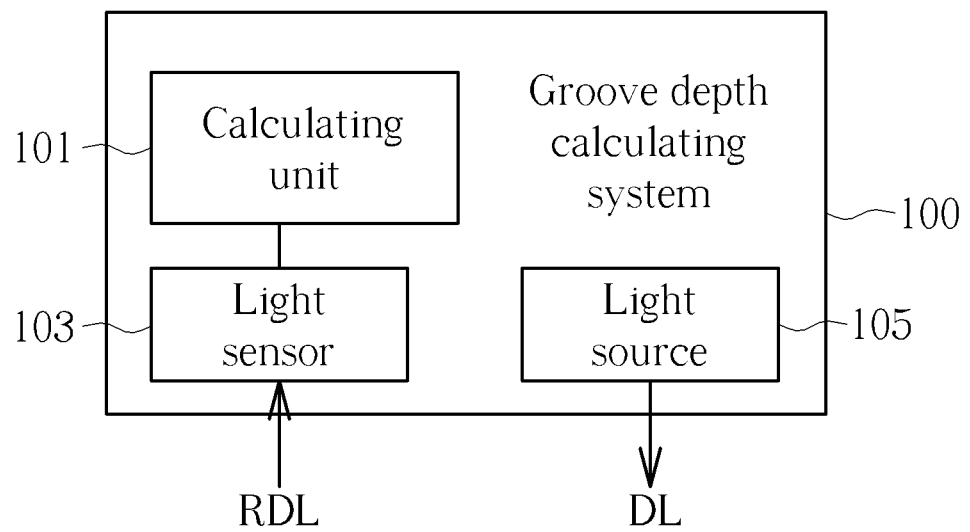
FIG. 1 is a block diagram illustrating an object surface detecting system according to one embodiment of the present invention.

FIG. 1 is a block diagram illustrating an object surface detecting system according to one embodiment of the present invention. Please note, the object surface detecting system can be applied to measure the groove depths of a tire, but also can be applied to measure a target object on the object surface, which will be described later.

Figure 2:
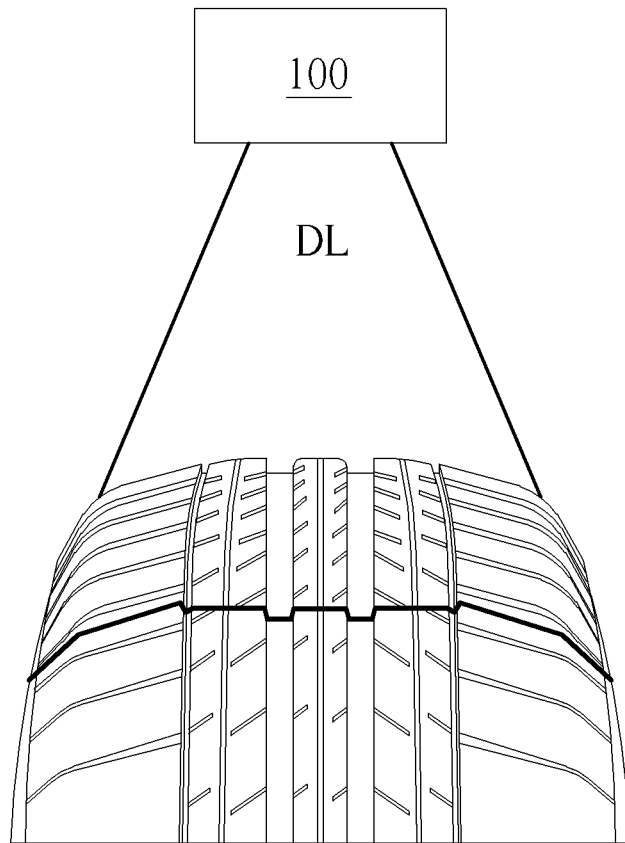
FIG. 2, FIG. 3, FIG. 4, and FIG. 5 are schematic diagrams illustrating how to calculate groove depths according to embodiments of the present.

Please refer to FIG. 1 and FIG. 2 to understand concept of the present invention for more clear. As illustrated in FIG. 1, the object surface detecting system 100 comprises a calculating unit 101, a light sensor 103, and a light source 105. The light source 105 emits detecting light DL to a tire 201, as illustrated in FIG. 2. The light sensor 103 receives reflected detecting light RDL generated by the detecting light DL. The calculating unit 101 calculates groove depths of the tire grooves according to the reflected detecting light RDL. Details for how to calculate groove depths will be described later. In one embodiment, the object surface detecting system 100 can be provided in a portable electronic apparatus such as a mobile phone. In another embodiment, the components of the object surface detecting system 100 can be provided in different electronic apparatuses. For example, the calculating unit 101 is provided in a vehicle comprising the tire, and the light sensor 103, the light source 105 are provided in another electronic apparatus near the tire.

In the embodiment of FIG. 2, the light source 105 is a line light source, but can be replaced by other types of light sources. For example, the light source 105 can be a movable point light source, which can move in a range to be detected of a tire. Additionally, the light source 105 can be a surface light source, which can calculate a larger number of groove depths per time.

Figure 3:
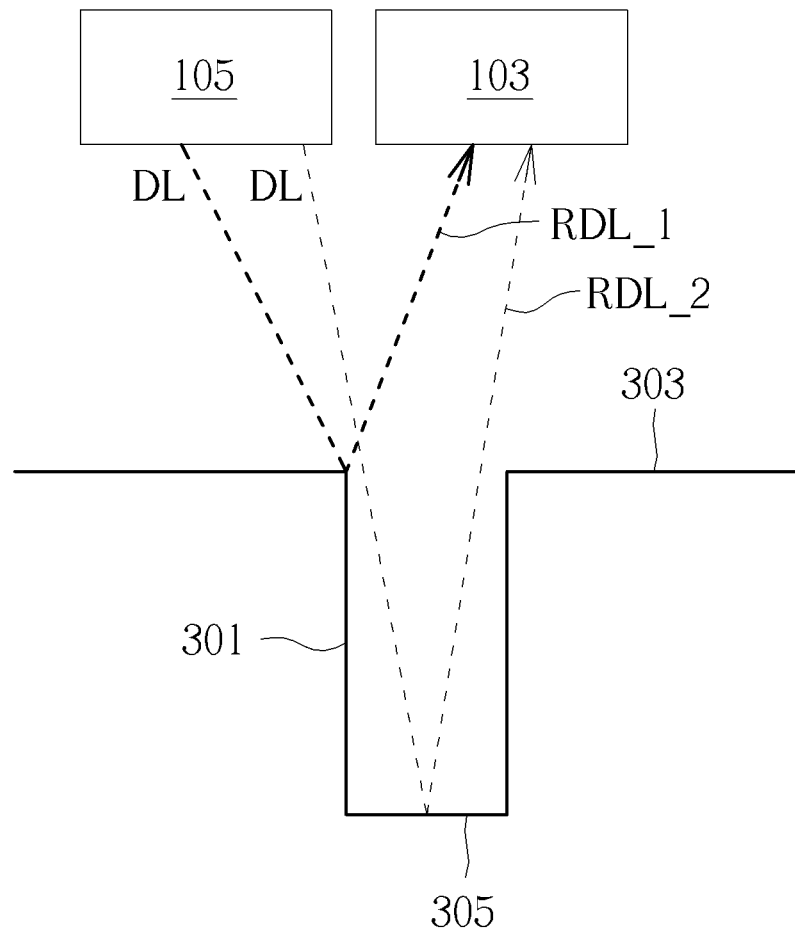

Please refer to FIG. 3, which illustrates an example of calculating a groove depth. As illustrated in FIG. 3, the light source 105 emits detecting light DL to a tire groove 301 and a tire surface 303. Also, the light sensor 103 receives first reflected detecting light RDL_1 from the tire surface 303 and second reflected detecting light RDL_2 from the tire groove bottom 305. The calculating unit 101 in FIG. 1 can calculate a first distance between the surface 303 and the light sensor 103 according to the detecting light DL and the first reflected detecting light RDL_1, and can calculate a second distance between the tire groove bottom 305 and the light sensor 103 according to the detecting light DL and the second reflected detecting light RDL_2. The difference between the first distance and the second distance can be applied to calculate the groove depth. Details for measuring a distance according reflected light are well known by persons skilled in the art (ex. a laser rangefinder), thus descriptions are omitted for brevity here.

Figure 4:
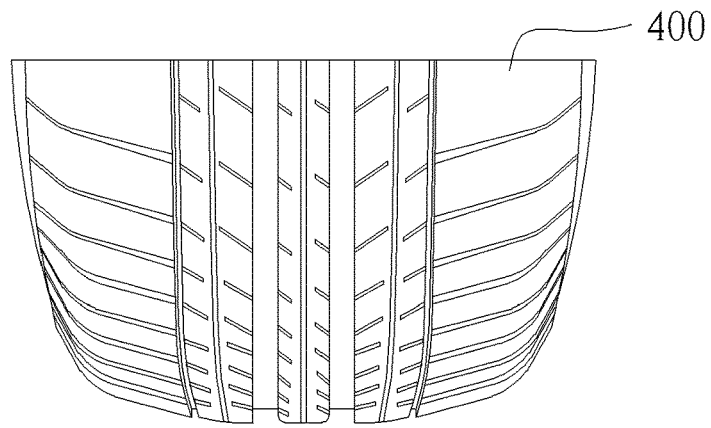
Figure 4:
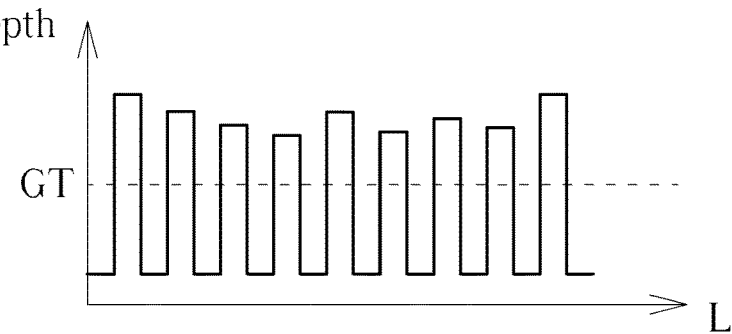
Figure 5:
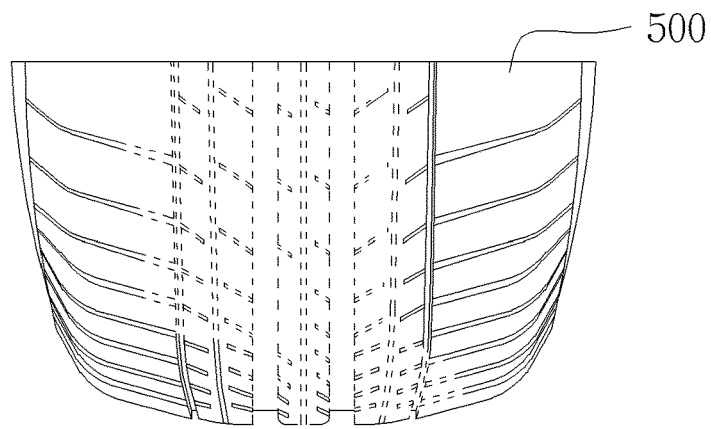
Figure 5:

As above-mentioned, the light source can be a line light source, thus a plurality of groove depths can be calculated per time. As illustrated in FIG. 4, the tire 400 comprises obvious tire grooves, thus the groove depths thereof all exceed a groove depth threshold GT. On the opposite, as illustrated in FIG. 5, the tire 500 comprises non-obvious tire grooves, which are shown in dotted lines, thus the groove depths thereof are below the groove depth threshold GT.

Figure 6:
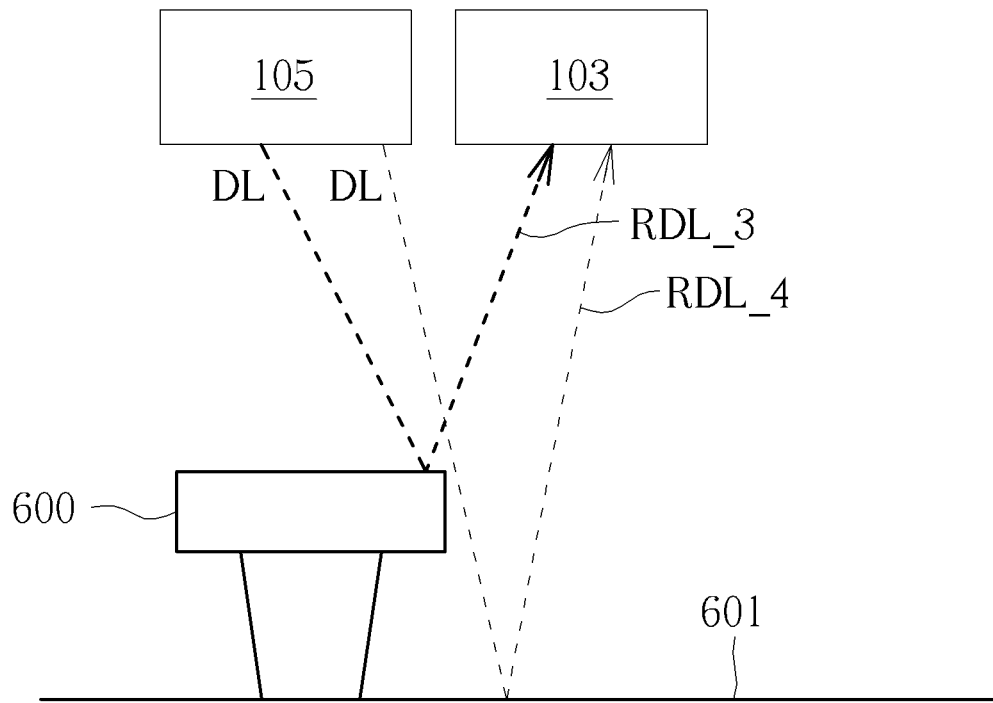
FIG. 6, FIG. 7, FIG. 8 and FIG. 9 are schematic diagrams illustrating how to calculate a target object on the tire according to embodiments of the present.

In another embodiment, the object surface detecting system 100 can be applied to detect a target object on a surface of a tire. The target object may pierce into the tire such that protrudes from a surface of the tire or causes a hole on the tire. Or, target object is stuck on the tire. As illustrated in FIG. 6, the light source 105 emits the detecting light DL to a target object 600 protruding from a surface 601 of a tire. The light sensor 103 receives third reflected detecting light RDL_3 from a top of the target object 600 and fourth reflected detecting light RDL_4 from the surface 601 adjacent to the target object 600. Based on the detecting light DL, the third reflected detecting light RDL_3 and the fourth reflected detecting light RDL_4, a third distance between the top of the target object 600 and the light sensor 103 can be acquired, and a fourth distance between the surface 601 adjacent to the target object 600 and the light sensor 103 can be acquired. After that, a height of the target object 600 can be calculated according to the third distance and the fourth distance.

Figure 7:
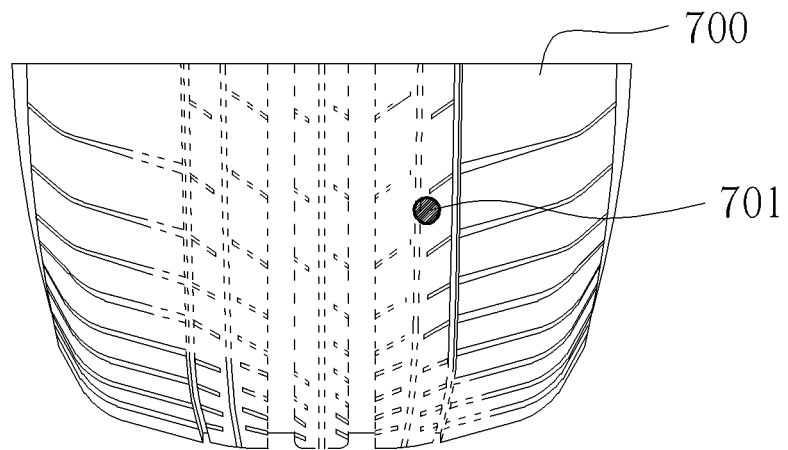
Figure 7:
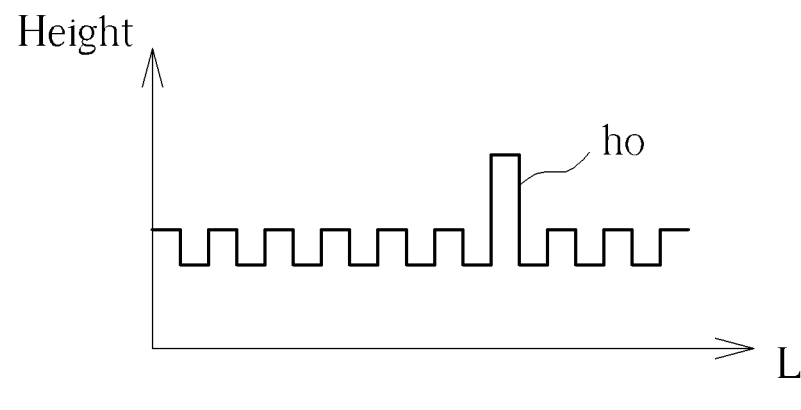
Figure 7:
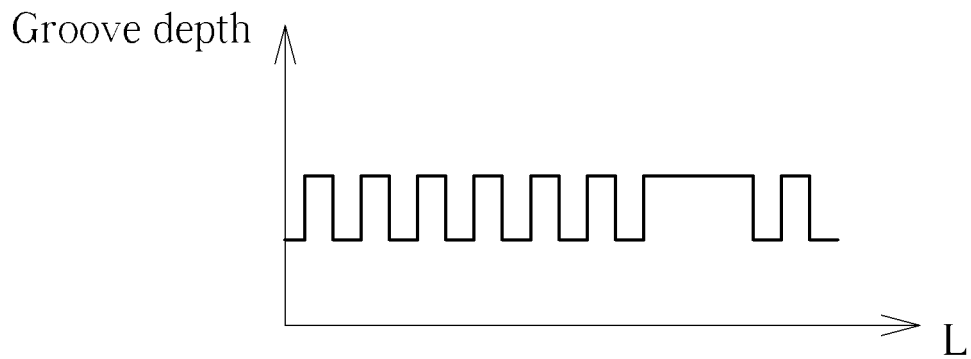

Please refer to FIG. 7, which comprises a chart A indicating the height of the target object on the tire 700 and a chart B indicating the groove depths for the tire groove. For the chart A, some heights may be negative, such as the heights of tire grooves. The height ho of the target object 600 is particularly larger than other heights, thus the target object 600 can be clearly identified based on the detected heights.

Figure 8:
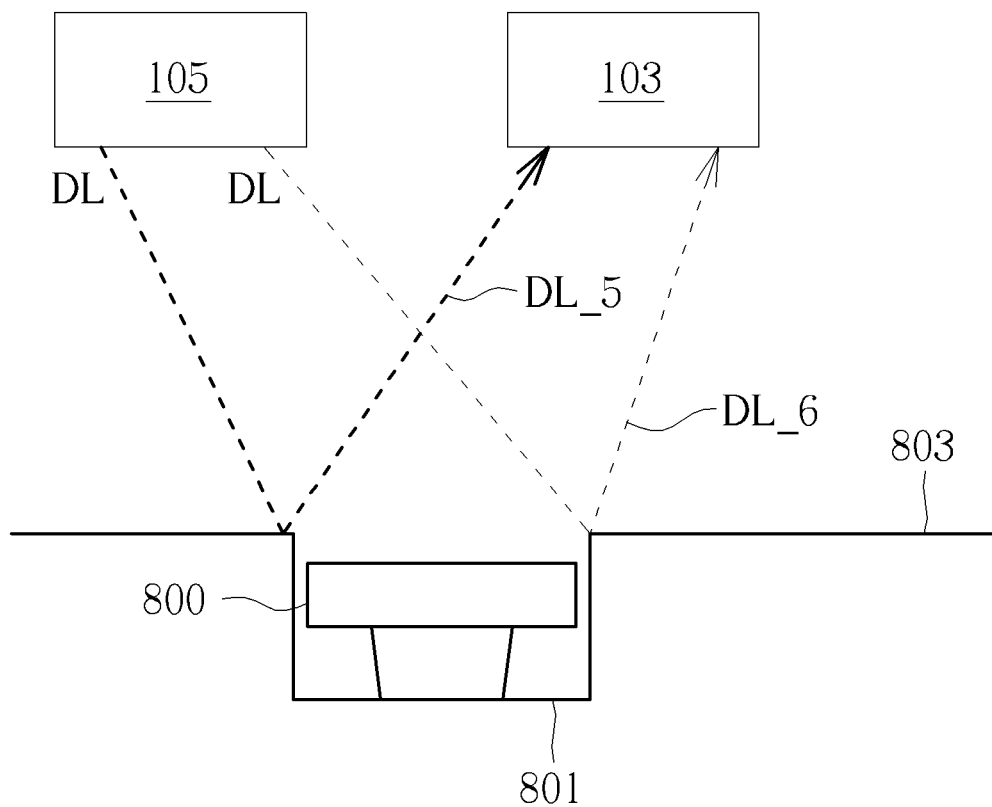

In one embodiment, a top of the target object in the tire 700 is lower than the surface of the tire and accordingly causes a large hole having a width larger than which of other tire grooves. Accordingly, such hole can be identified based on the widths. As shown in FIG. 8, an target object 800 pierces into a surface 803 of a tire, and causes a hole 801. The light source 105 emits detecting light DL to the surface 803, and the light sensor 103 receives reflected detecting light DL_5, DL_6. Based on above-mentioned description, the depths of the hole can be acquired, thus the location of the hole 801 can be identified based on the depths. By this way, the width of the hole 801 can be accordingly calculated. That is, if a width of any tire groove is larger than a width threshold, it can be determined that a hole which is not a tire groove exists on the tire 700.

Figure 9:
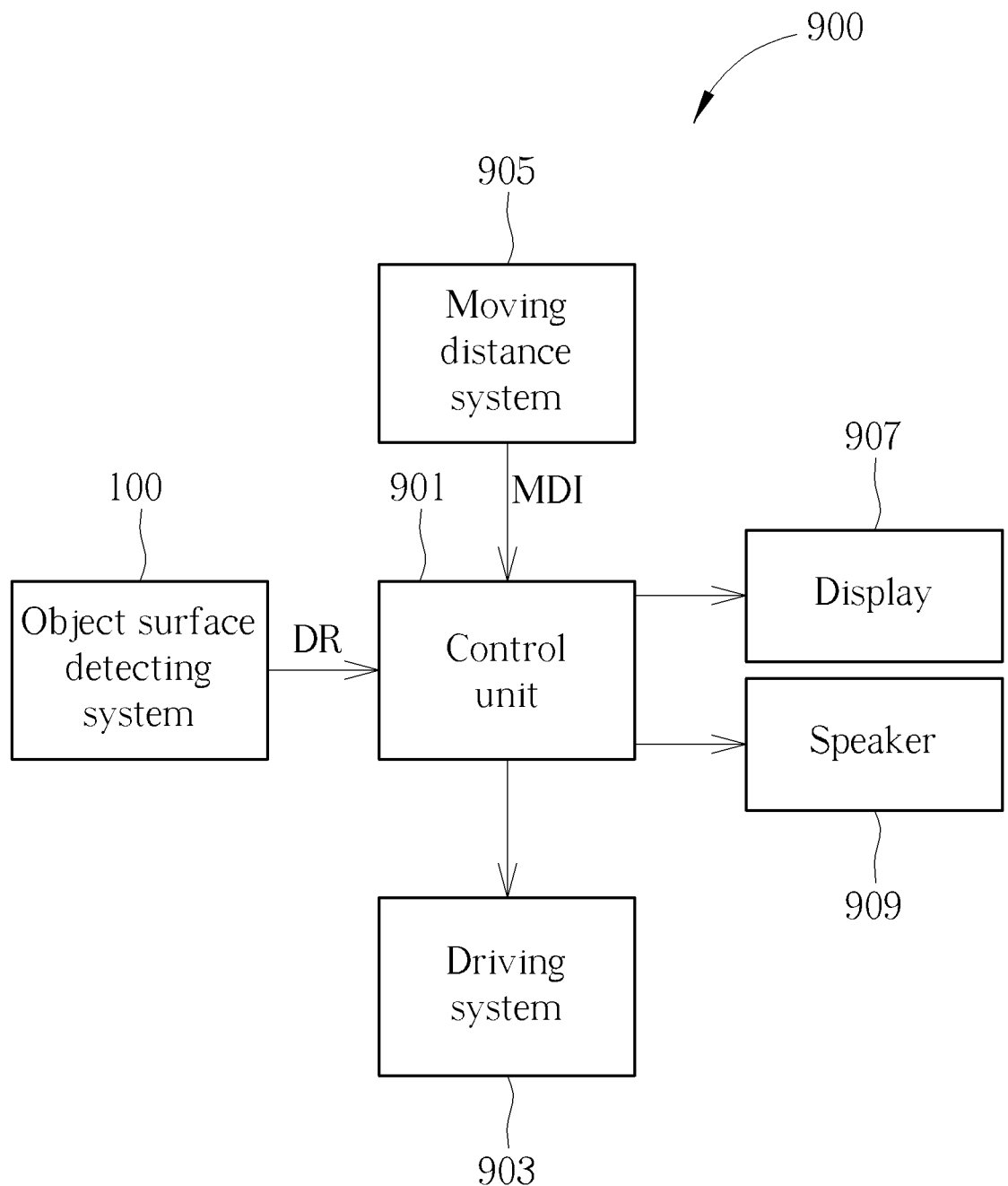

In one embodiment, the above-mentioned detecting results are employed for further application. As illustrated in a vehicle system 900 of FIG. 9, the object surface detecting system 100 is coupled to a control unit 901, and transmits detecting result DR to the control unit 901. Please note, the function of the above-mentioned calculating unit can be integrated to the control unit 901.

The control unit 901 activates a protection mechanism if the detecting result indicates the groove depths of the tire grooves are too shallow (i.e. the groove depth is lower than a groove depth threshold) or something dangerous is on the tire (ex. a width of a hole on tire is larger than a width threshold or a height of a target object is larger than a height threshold). The protection mechanism can be, for example, generating a reminding message which can be displayed on the display 907 or can be played via the speaker 909. Also, the protection mechanism can be locking the driving system 903 if the vehicle is in a stop state, such that a user cannot move the vehicle comprising the vehicle system 900.

In another embodiment, the control unit 901 is further coupled to a moving distance system 905, which provides moving distance information MDI (ex. mileage) to the control unit 901. The control unit 901 can calculating a relation between a moving distance of the vehicle and the groove depth, estimates a moving distance threshold according to the relation and the groove depth; and generates a reminding message if a difference between a current moving distance of the vehicle and the moving distance threshold is lower than a predetermined value. For example, if a groove depth of the tire groove is A while the moving distance is Xkm, and groove depth of the tire groove of the tire is B while the moving distance is Ykm, the relation between the moving distance and the groove depth is $$\frac{A-B}{X-Y}.$$

Please note the groove depth here can mean a maximum or a minimum groove depth among all detected groove depths, or mean an average for all detected groove depths.

Accordingly, a moving distance threshold can be acquired based on the groove depth threshold and such relation. After that, a reminding message is generated if a difference between a current moving distance of the vehicle and the moving distance threshold is lower than a predetermined value (i.e. the current moving distance is approaching the moving distance threshold).

Figure 10:
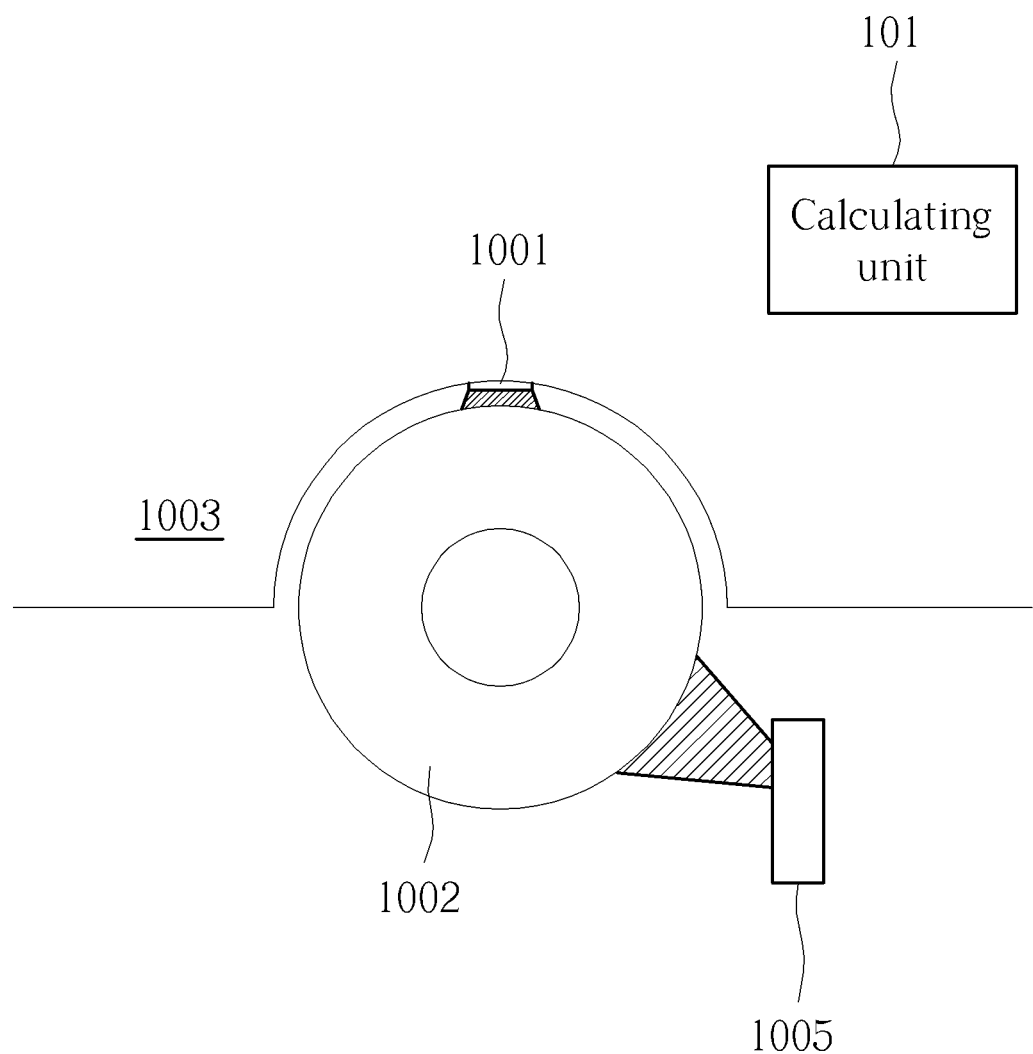
FIG. 10 is a schematic diagram illustrating practical examples for measuring groove depths of tire grooves

FIG. 10 is a schematic diagram illustrating practical examples for measuring groove depths of tire grooves. In one embodiment, the light sensor 103 and the light source 105 can be provided in an electronic apparatus 1001 fixed near tire 1002, and the calculating unit 101 is provided in the vehicle body 1003 or provided in the electronic apparatus 1001. In such case, the electronic apparatus 1001 can further comprise a cover (not illustrated). In a non-active mode, the cover closes to prevent water or dust damaging the light sensor 103 and the light source 105. Also, in an active mode, the cover opens such that the tire grooves can be measured. In another embodiment, the light sensor 103 and the light source 105 is provided in a portable electronic apparatus 1005 such as a mobile phone, and the calculating unit 101 is provided in the vehicle body 1003 or provided in the portable electronic apparatus 1005.

In above-mentioned embodiments, tire grooves are applied as examples to explain the present invention. However, tire grooves can be replaced with grooves of any object, for example, a machine component. Therefore, in view of above-mentioned embodiments, an object surface managing method can be acquired, which comprises following steps: (a) emitting detecting light to a groove on an object to be detected (ex. a tire) via a light source (ex. 103 in FIG. 3); (b) receiving first reflected detecting light from the surface and second reflected detecting light from a bottom of the groove via a light sensor (ex. RDL_1, RDL_2, 103 in FIG. 3); and (c) calculating a groove depth of the groove according to the first reflected detecting light and the second reflected detecting light.

As above-mentioned, the object surface managing method can also be employed to detect a target object on the tire. Other details can be acquired based on above-mentioned embodiments, thus descriptions thereof are omitted for brevity here.

In view of above-mentioned embodiments, the tire grooves can be measured more accurately and automatically. Also, a dangerous object or a hole on the tire can be detected as well. Thus the disadvantages of conventional methods can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tire surface managing method, comprising:
emitting detecting light to a target object on a surface of a tire;
receiving reflected detecting light from the target object and reflected detecting light from the surface adjacent to the target object;
determining whether the target object protrudes from the surface according to a distance calculated according to the reflected detecting light from the target object and a distance calculated according to the reflected detecting light from the surface adjacent to the target object;
determining whether the target object forms a hole on the surface according to the distance calculated according to the reflected detecting light from the target object and the distance calculated according to the reflected detecting light from the surface adjacent to the target object;
receiving the reflected detecting light from the surface to calculate a width of the hole on the tire; and
activating a protection mechanism for a vehicle comprising the tire if the width is larger than a width threshold.

2. A tire surface managing system, comprising:
a light source, configured to emit detecting light to a target object on a surface of a tire;
a light sensor, configured to receive reflected detecting light from the target object and reflected detecting light from the surface adjacent to the target tire;
a calculating unit, configured to determine whether the target object forms a hole on the surface according to the distance calculated according to the reflected detecting light from the target object and the distance calculated according to the reflected detecting light from the surface adjacent to the target object; and
a control unit;
wherein the calculating unit further calculates a width of the hole according to the reflected detecting light from the surface, and the control unit activates a protection mechanism for a vehicle comprising the tire if the width is larger than a width threshold.

3. A tire surface managing system, applied to a vehicle comprising a tire, comprising:
a light source, configured to emit light to a groove on a surface of the tire;
a light sensor, configured to receive first reflected detecting light from the surface and second reflected detecting light from a bottom of the groove via the light sensor;
a calculating unit, configured to calculate a groove depth of the groove according to the first reflected detecting light and the second reflected detecting light; and
a control unit, configured to perform following steps:
calculating a relation between a moving distance of the vehicle and the groove depth;
estimating a moving distance threshold according to the relation and the groove depth; and
generating a reminding message if a difference between a current moving distance of the vehicle and the moving distance threshold is lower than a predetermined value.

4. The tire surface managing system of claim 3, wherein the control unit is further configured to activate a protection mechanism for the vehicle if the calculating unit determines that a target object protrudes from the surface.

5. The tire surface managing system of claim 3, wherein the light source is a line light source.

6. The tire surface managing system of claim 3, wherein the control unit is further configured to activate a protection mechanism for the vehicle if the groove depth is lower than a groove depth threshold.

7. The tire surface managing system of claim 3, wherein the calculating unit further calculates a width of a hole on the tire according to detecting light from the surface, and the control unit activates a protection mechanism for the vehicle comprising the tire if the width is larger than a width threshold.

8. The tire surface managing system of claim 3, wherein the calculating unit is provided in the vehicle.

\* \* \* \* \*